No. 845,172. PATENTED FEB. 26, 1907.
D. O. GRAHAM.
COTTON AND CORN CHOPPER.
APPLICATION FILED DEC. 7, 1906.
2 SHEETS—SHEET 1.
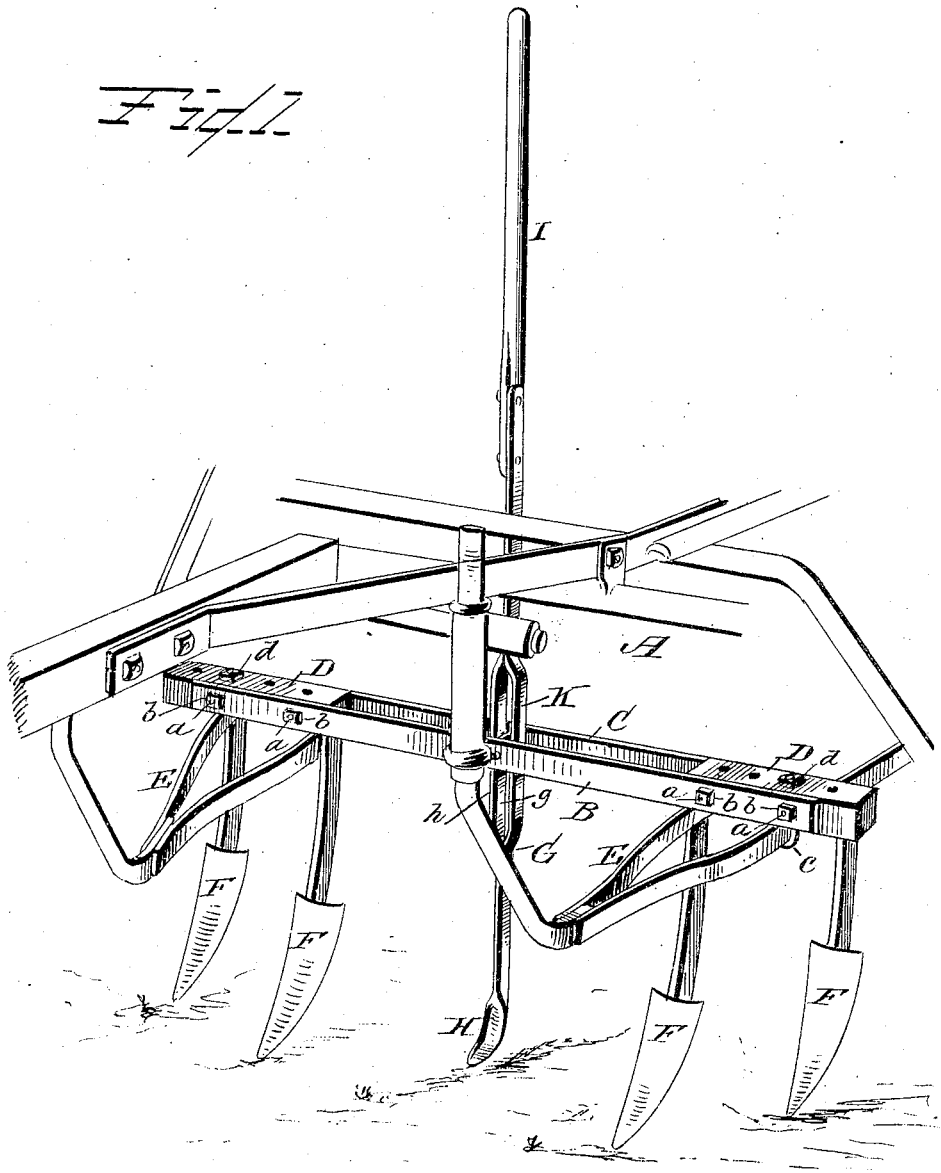
Witnesses
F. H. Hubbard
Jno. E. Burch
Inventor
Daniel O. Graham
By Chas. H. Fowler
Attorney No. 845,172. PATENTED FEB. 26, 1907.
D. O. GRAHAM.
COTTON AND CORN CHOPPER.
APPLICATION FILED DEC. 7, 1906.
2 SHEETS—SHEET 2.
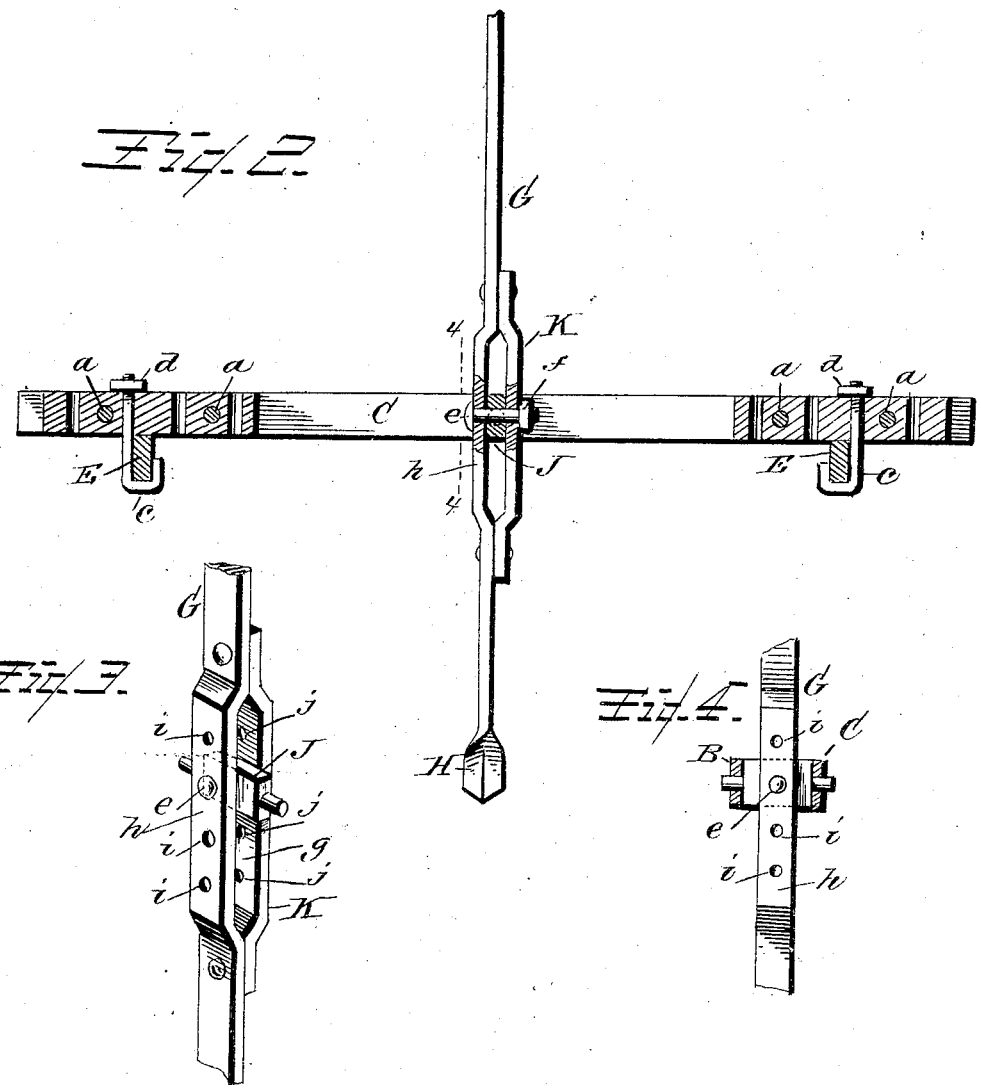
Witnesses
Inventor
Daniel O. Graham.
By Chas. N. Fowler
Attorney

UNITED STATES PATENT OFFICE.

DANIEL O. GRAHAM, OF PROCTOR, TEXAS.

COTTON AND CORN CHOPPER.

No. 845,172.　　　Specification of Letters Patent.　　　Patented Feb. 26, 1907.

Application filed December 7, 1906. Serial No. 346,810.

*To all whom it may concern:*

Be it known that I, DANIEL O. GRAHAM, a citizen of the United States, residing at Proctor, in the county of Comanche and State of Texas, have invented certain new and useful Improvements in Cotton and Corn Choppers; and I do hereby declare that the following is a full, clear, and exact description of the same, reference being had to the annexed drawings, making a part of this specification, and to the letters and figures of reference marked thereon.

The present invention has for its object to provide means for attachment to a cultivator to chop or thin corn, cotton, and other drilled plants at the same time it is being plowed and without interfering with the work of the cultivator to which the device is attached, and consists in an attachment constructed substantially as shown in the drawings and hereinafter described and claimed.

Figure 1 of the drawings is a perspective view of the attachment, showing it connected to the front of a cultivator-frame. Fig. 2 is an elevation of the attachment, partly in section. Fig. 3 is a perspective of a portion of the guide-bar lever. Fig. 4 is a side elevation thereof, partly in section.

In the accompanying drawings, A represents a portion of the frame of a cultivator, which may be of any preferred construction, the device constituting my invention being connected to the beam of the cultivator or any portion thereof slightly ahead of the front plow, or if desired it may be placed under the beam or the cross-beam may be curved downward sufficiently to give to the operator increased leverage.

I do not wish to be understood as limiting my invention to any special way or means of attaching the device to the frame of the cultivator, as the manner of attachment may be variously modified or changed without departing from the essential feature of my invention.

The attachment consists in part of two longitudinal and parallel bars B C, which together form the beam and are secured at their ends by suitable bolts $a$ and nuts $b$ to head-blocks D, so as to retain said bars the required distance apart.

To the blocks D are secured hangers $c$ through the medium of the nuts $d$, whereby the bars B C are clamped to the portions E of the cultivator, the cultivator teeth or shovels being indicated at F in Fig. 1 of the drawings.

The guide-bar lever is shown at G and is provided at its lower end with a suitable shovel H and has connected to its upper end a hand-lever I. The guide-bar lever G is pivotally connected to the bars B C through the medium of the axle or pivot-block J, which in turn is connected to the lever by bolt $e$ and nut $f$. The guide-bar lever G has an offset $h$ with a plurality of holes therein, and suitably secured to the lever directly opposite the offset is a brace K.

The brace K has an offset corresponding to the offset $h$, so that when in position a space $g$ will be left for the pivot-block J, said brace also having a plurality of holes $j$, corresponding with the holes in the offset of the lever, whereby the block may be vertically adjusted to increase or diminish the height of the shovel H with relation to the frame of the cultivator.

The attachment can remain on the cultivator as long as desired to plow corn or cotton and will not be in the way, but, on the contrary, will add strength to the cultivator and can then cultivate the drill as well as cut out any surplus corn or cotton that may be left.

In order to use it on large corn that is liable to be broken by the cross-beam of the attachment, any suitably-formed fixture may be secured to one of the beams of the cultivator, the corn then striking such fixture, which may be of the required form to pass around without breaking.

Any suitable means may be employed for securing the attachment thereto so that the large corn will pass around without breaking, and a slight movement of the guide-bar lever will operate the attachment and the cotton can be left at any distance desired, so that the operator can chop and plow the cotton at the same time without any hindrance to the plowing whatever, and thereby save time and expense of chopping out with a hoe.

Having now fully described my invention, what I claim as new, and desire to secure by Letters Patent, is—

1. A corn and cotton chopper, comprising a suitable beam adapted for attachment to a cultivator, a guide-bar lever pivotally connected to the beam, and a shovel upon the lower end of the lever, substantially as and for the purpose set forth.

2. A corn and cotton chopper, comprising a suitable beam adapted for attachment to a cultivator, a guide-bar lever carrying a shovel and pivotally connected to the beam, and means for vertically adjusting said lever, substantially as and for the purpose described.

3. A corn and cotton chopper, comprising a beam consisting of two parallel bars with space between the same, a guide-bar lever located between the bars of the beam and pivotally and adjustably connected thereto, substantially as and for the purpose specified.

4. A corn and cotton chopper, comprising a beam consisting of two parallel bars, a guide-bar lever carrying a shovel, said lever having an offset and a brace connected thereto with a corresponding offset, said offset having a plurality of holes, a pivot-block located between the offsets and adjustably connected thereto, the block being pivotally connected to the sides of the parallel bars, substantially as and for the purpose set forth.

In testimony whereof I affix my signature in presence of two witnesses.

DANIEL O. GRAHAM.

Witnesses:
JOHN O. WILLIAMS,
T. M. CONDRON.